United States Patent [19]

Dale, II

[11] Patent Number: 5,611,561

[45] Date of Patent: Mar. 18, 1997

[54] FISHING CART SYSTEM

[76] Inventor: William J. Dale, II, 115 Thames Place NW., Ft. Walton Beach, Fla. 32548

[21] Appl. No.: 501,612

[22] Filed: Jul. 12, 1995

[51] Int. Cl.$^6$ ...................................................... B62B 1/12
[52] U.S. Cl. ...................... 280/652; 280/47.19; 280/79.3
[58] Field of Search ................................ 280/35, 42, 43, 280/638, 639, 651, 652, 655, 655.1, 43.14, 43.24, 47.12, 47.131, 47.18, 47.19, 47.2, 47.21, 47.24, 47.27, 47.26, 47.29, 47.315, 47.34, 47.35, 47.36, 47.371, 47.41, 79.3

[56] References Cited

U.S. PATENT DOCUMENTS

| | | | |
|---|---|---|---|
| 246,359 | 11/1977 | Powers et al. | D12/29 |
| 323,413 | 1/1992 | Miller | D34/26 |
| 2,428,853 | 10/1947 | Procter | 280/47.23 |
| 2,716,558 | 8/1955 | Sullivan | 280/651 |
| 3,534,432 | 10/1970 | Davies, III et al. | 280/655.1 |
| 4,637,626 | 1/1987 | Foss et al. | 280/655.1 |
| 5,159,777 | 11/1992 | Gonzalez | 43/54.1 |
| 5,192,092 | 3/1993 | DiBenedetto | 280/652 |
| 5,203,815 | 4/1993 | Miller | 280/47.26 |
| 5,333,885 | 8/1994 | Pullman | 280/47.19 |

Primary Examiner—Richard M. Camby
Assistant Examiner—Frank Vanaman
Attorney, Agent, or Firm—Joseph N. Breaux

[57] ABSTRACT

A fishing cart system for transporting a quantity of fishing equipment to and from a fishing site including a collapsible cart assembly having a plurality of fishing rod and reel storage tubes secured to a U-shaped central support member having a first and second end; a fishing equipment support structure, pivotally connected to the first end of the central support member, including a wheel assembly including first and second wheel members connected together with an elongated axle; and a handle assembly pivotally connected to the second end of the U-shaped central support member in a manner to allow the handle assembly to pivot about at least 180 degrees with respect to the U-shaped central support member for convenient storage. The fishing cart system may also include a protective outer cover securable to the fishing equipment support structure and the handle assembly of the fishing cart in the loaded configuration and having at least two wheel access slots sized to allow the first and second wheel of the fishing cart to pass partially therethrough contacting and functionally supporting the fishing cart above a surface while the cover is in place.

5 Claims, 4 Drawing Sheets

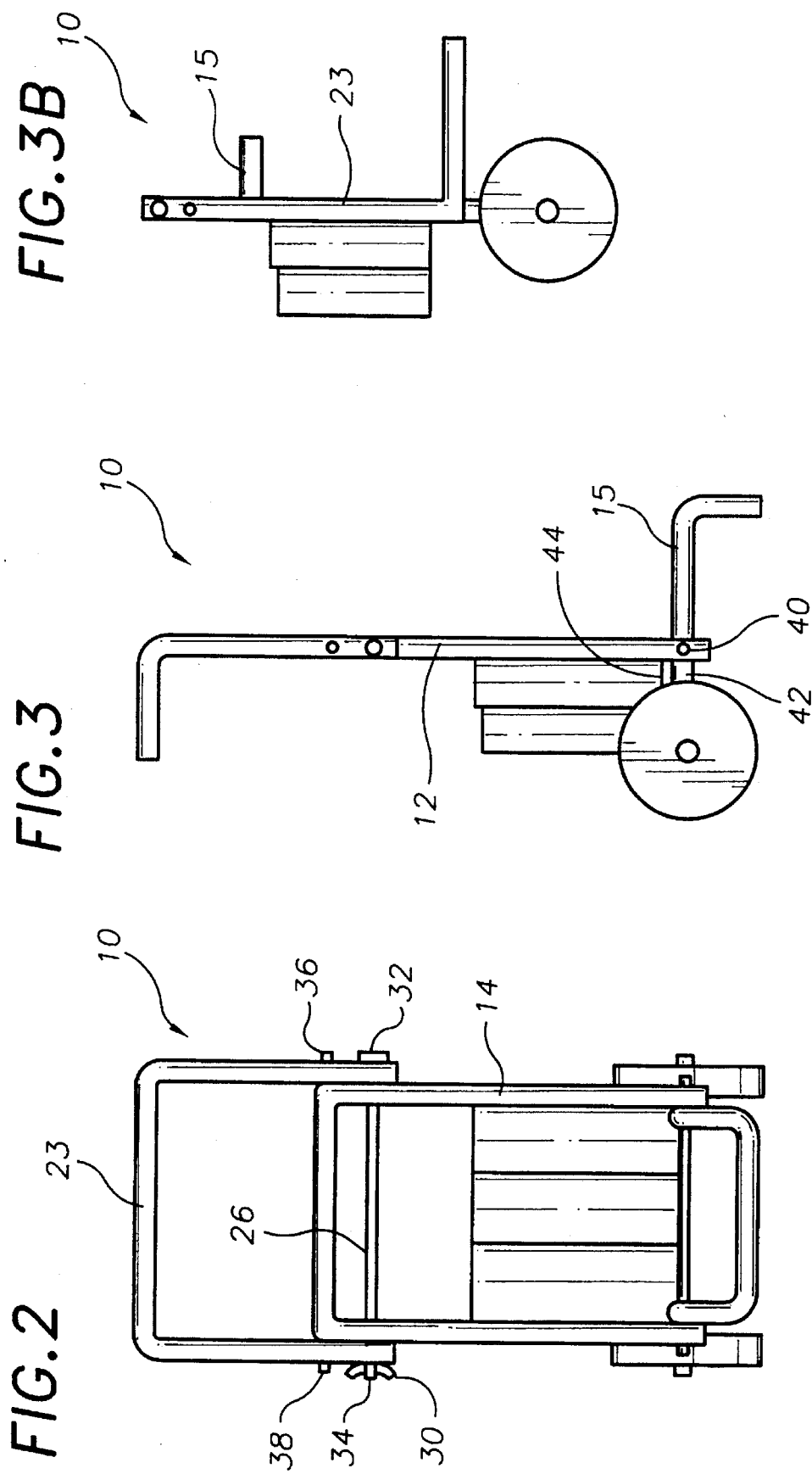

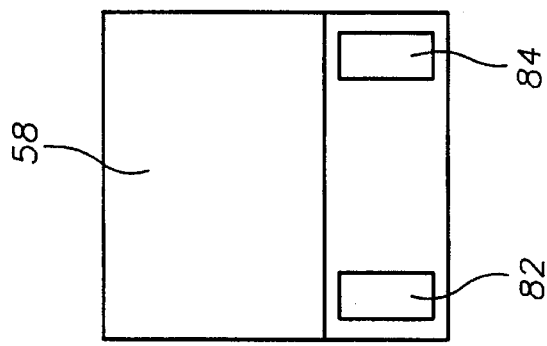
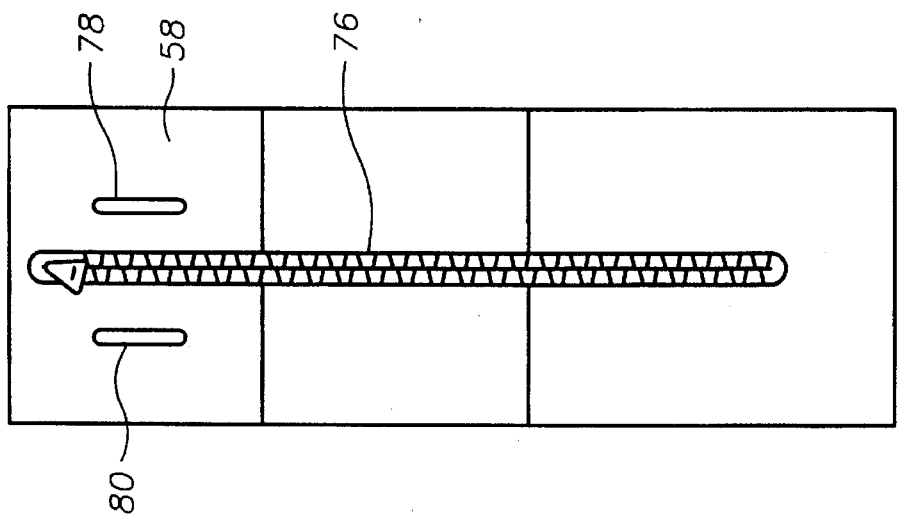
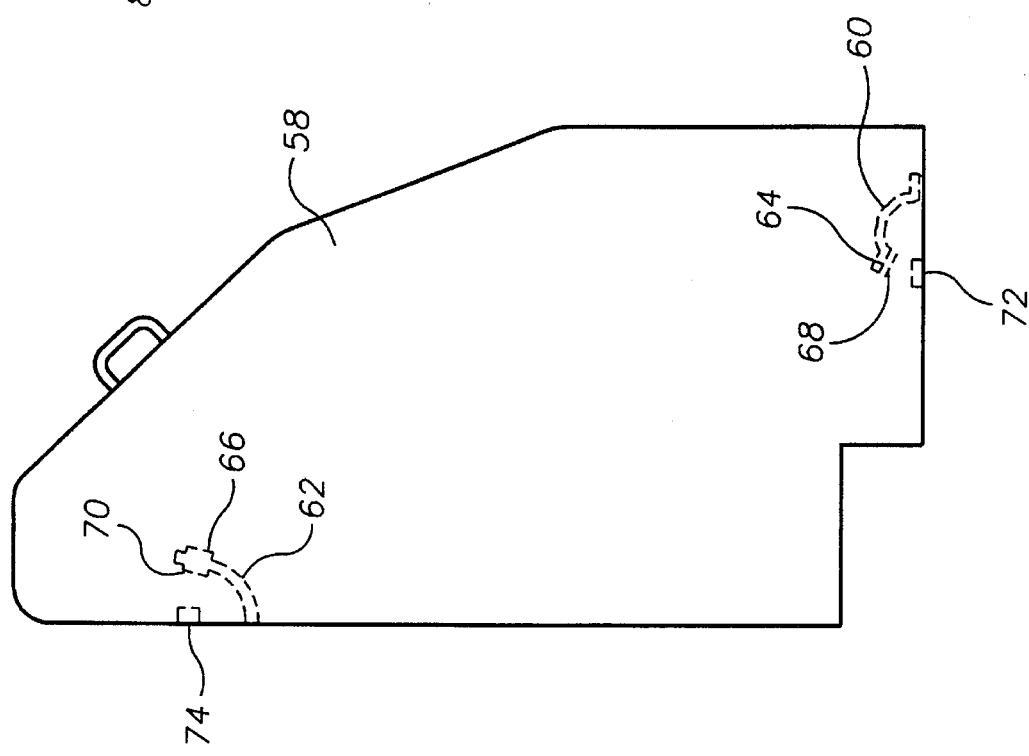

FISHING CART SYSTEM

DESCRIPTION

1. Technical Field

The present invention relates to devices used for transporting fishing equipment to and from a fishing site and more particularly to a system used for transporting fishing equipment to and from a fishing site that are collapsible for easy storage and that may be utilized while using common carrier transportation such as buses or trains.

2. Background Art

Fishing along seawalls, coastal beaches, and from fishing piers is a popular pastime in many coastal areas. The equipment necessary for fishing of this type generally consists of an ice chest, a tackle box, one or more fishing rods with reels, and some type of bait preserving equipment such as a portable live bait container with an aerator pump. Although such fishing may be limited to a single location, it is often desirable to fish a succession of locations until a productive fishing spot is located. Leaving the fishing equipment unattended at the first fishing location can result in stolen equipment and loss in fishing time caused by having to return to the first location when new bait or fishing equipment is needed to continue fishing. The alternative to leaving the fishing equipment unattended is relocating the fishing equipment each time the fishing location is altered. Relocating the necessary fishing equipment from one fishing location to the next can be time consuming and cumbersome. It would be desirable, therefore, to have a cart to which all the necessary fishing equipment could be attached and easily transported from one fishing spot to another.

It would also be desirable if the fishing cart were constructed primarily from non-corrodible materials since the majority of these fishing locations are adjacent large bodies of salt water. It would be a still further benefit if the cart were collapsible to allow for easy storage behind a seat or in an automobile trunk when not in use.

It would also be desirable to have a fishing cart system that could be utilized while traveling to fishing sites on common carriers such as commuter buses and/or trains without exposing expensive and often dangerous fishing equipment to other passengers.

GENERAL SUMMARY DISCUSSION OF INVENTION

It is thus an object of the invention to provide a fishing cart system for easily transporting a quantity of fishing equipment from one fishing spot to another.

It is a further object of the invention to provide a collapsible fishing cart to allow for easy storage of the fishing cart when it is not in use.

It is a still further object to provide a fishing cart system that allows a quantity of fishing equipment to be transported safely and conveniently on common carriers such as commuter buses and/or trains.

It is a still further object of the invention to provide a fishing cart system that accomplishes all or some of the aforementioned objectives.

Accordingly, a fishing cart system for transporting a quantity of fishing equipment to and from a fishing site is provided. In its most basic form the fishing cart system includes a collapsible cart assembly having a plurality of fishing rod and reel storage tubes secured to a U-shaped central support member having a first and second end; a fishing equipment support structure, pivotally connected to the first end of the central support member, including a wheel assembly including first and second wheel members connected together with an elongated axle; and a handle assembly pivotally connected to the second end of the U-shaped central support member in a manner to allow the handle assembly to pivot about at least 180 degrees with respect to the U-shaped central support member for convenient storage. The fishing equipment support structure pivots away from the first end of the central support member in a manner to form the horizontal section of a L-shaped transportation structure similar to that of a hand truck transportation structure. In use, fishing equipment support structure provides a support for fishing equipments such as ice chests, tackle boxes, and bait containers. The U-shaped central support member is fitted with several tubular rod and reel holding structures.

A portion of the equipment support structure is preferably pivotally connected between the non-connected terminal ends of the U-shaped central support member and the handle assembly is preferably lockable in place by an elongated rod passing through a first and second portion of the handle assembly and a third and fourth portion of the U-shaped central support member.

In a preferred embodiment, the fishing cart system further includes a plurality of elastic cords that may be secured about fishing equipment and the U-shaped central member to hold the fishing equipment in place with respect to the fishing equipment support structure.

In another preferred embodiment, the fishing cart system further includes a protective outer cover securable to the fishing equipment support structure and the handle assembly of the fishing cart in the loaded configuration and having at least two wheel access slots sized to allow the first and second wheel of the fishing cart to pass partially therethrough contacting and functionally supporting the fishing cart above a surface while the cover is in place. Inclusion of the cover in the fishing cart system serves the dual purpose of providing a safety cover while utilizing the cart on a common carrier and provides a protective dust cover for fishing equipment when the fishing cart and equipment are stored in a garage, storeroom, etc.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is a front view of the collapsible cart assembly of FIG. 1.

FIG. 3 is a side view of the collapsible cart assembly of FIG. 1.

FIG. 3B is a side view of the collapsible cart assembly of FIG. 1 in the collapsed configuration with the handle member and the horizontal support members folded into their respective storage positions.

FIG. 5 is a side view of the travel cover of FIG. 6 showing one of the two handles and one of the two cart wheel slots with a cart wheel protruding therefrom.

FIG. 6 is a front view of the travel cover of FIG. 6 showing the zippered access opening and the two handles.

FIG. 7 is a is a bottom view of the travel cover of FIG. 6 showing the two cart wheel slots.

EXEMPLARY MODE FOR CARRYING OUT THE INVENTION

Figure 1:
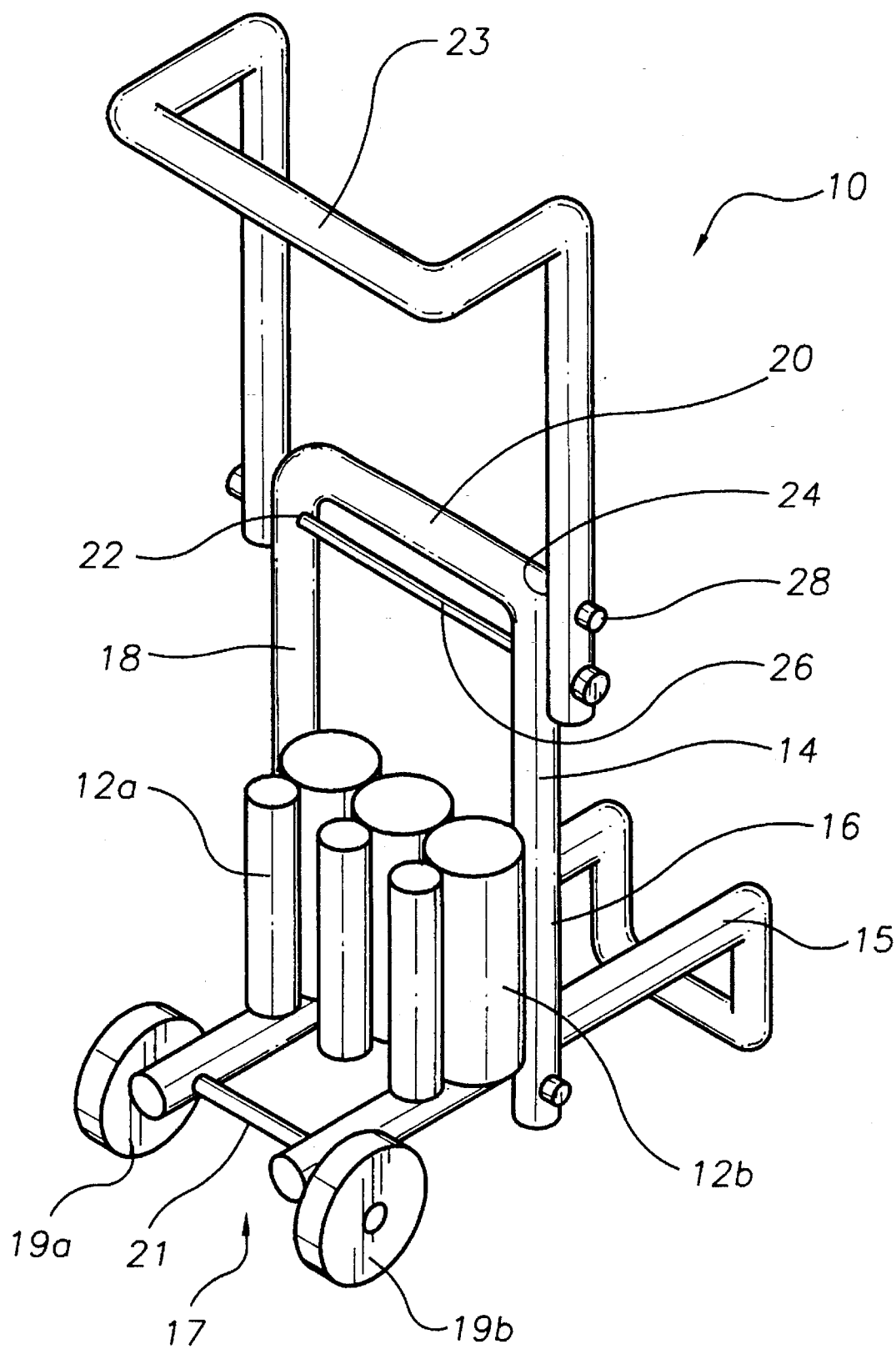
FIG. 1 is a perspective view of an exemplary embodiment of the collapsible cart assembly of the fishing cart system of the present invention in the un-collapsed configuration.

FIG. 1 is a perspective view of an exemplary embodiment of the collapsible cart of the fishing cart system of the present invention, generally referenced by the numeral 10. The figure illustrates collapsible cart 10 in the un-collapsed configuration used for transporting fishing equipment to and from a fishing site.

Collapsible cart 10 includes a plurality of fishing rod and reel storage tubes 12a,12b secured to a U-shaped central support member 14; a fishing equipment support structure 15, pivotally connected to central support member 14, including a wheel assembly 17 including first and second wheel members 19a,19b connected together with an elongated axle 21; and a handle assembly 23 pivotally connected to U-shaped central support member 14 in a manner to allow handle assembly 23 to pivot about one-hundred-eighty (180°) degrees with respect to U-shaped central support member 14.

Each storage tube 12b is sized to receive the handle portion of a two, or more, part rod assembly having a diameter of about two (2") inches and a length of about seven (7") inches. Each storage tubes 12a is sized to receive the non-handle portions of a two, or more, part rod assembly having a diameter of about three-quarters (¾") of an inch and a length of about six (6") inches.

Central support member 14 is constructed from three-quarter (¾") inch Poly-Vinyl-Chloride (PVC) tubing bent into a substantially U-shaped configuration having a first terminal span 16, a second terminal span 18, and a central span 20 located between first terminal span 16 and second terminal span 18. Central support member 14 includes a pair of coaxially aligned aperture pairs 22, and two coaxially aligned pivot apertures 24. Aperture pairs 22 have a user removable locking bar 26 disposed therethrough. Pivot apertures 24 have a permanently installed pivot pin 28 installed therethrough in a manner to allow handle assembly 23 to pivot thereabout with respect to U-shaped central support member 14.

FIG. 2 is a front view of collapsible cart 10 showing wing-nut 30 and knurled knob 32 of locking bar 26. Wing-nut 30 is unthreaded from end 34 of locking bar 26 to allow handle assembly 23 to pivot with respect to U-shaped central support member 14. Also shown in the figure are the terminal ends 36,38 of pivot pin 28.

Figure 3A:
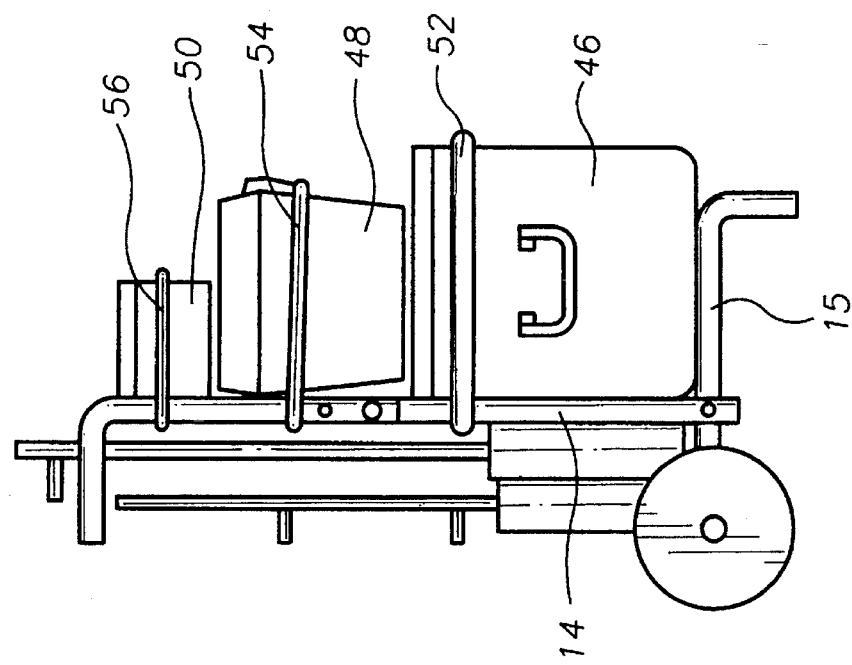
FIG. 3A is a side view of the collapsible cart assembly of FIG. 1 with representative fishing equipment secured in place.

FIG. 3 is a side view of collapsible cart 10 showing fishing equipment support structure 15 disposed at about a ninety (90°) degree angle with respect to U-shaped central support member 14. Equipment support structure 15 is pivotally connected to U-shaped central support member 14 using a second pivot pin 40. A second end 42 of equipment support structure 15 contacts the bottom portion 44 of storage tubes 12a,12b to prevent further rotation of equipment support structure 15 when it is oriented at about a ninety (90°) angle with respect to U-shaped central support member 14 as shown in the figure. When oriented at this angle, equipment support structure 14 and central support member 14 form an L-shaped transportation structure similar to that of a hand truck transportation structure. As shown in FIG. 3A, equipment support structure 15 provides a support for fishing equipment such as ice chest 46, tackle box 48, and bait container 50. Ice chest 46, tackle box 48, and bait container 50 are held in place by elastic cords 52,54, and 56 respectively that are secured about the fishing equipment and U-shaped central member 14 to hold the fishing equipment in place with respect to fishing equipment support structure 15.

FIG. 3B is a side view of collapsible cart 10 in the collapsed storage position showing handle assembly 23 and equipment support structure 15 pivoted one-hundred-eighty (180°) and ninety (90°) degrees respectively with respect to U-shaped central support member 14 (not shown) so that both handle assembly 23 and equipment support structure 15 are oriented parallel to U-shaped central support member 14.

Figure 4:
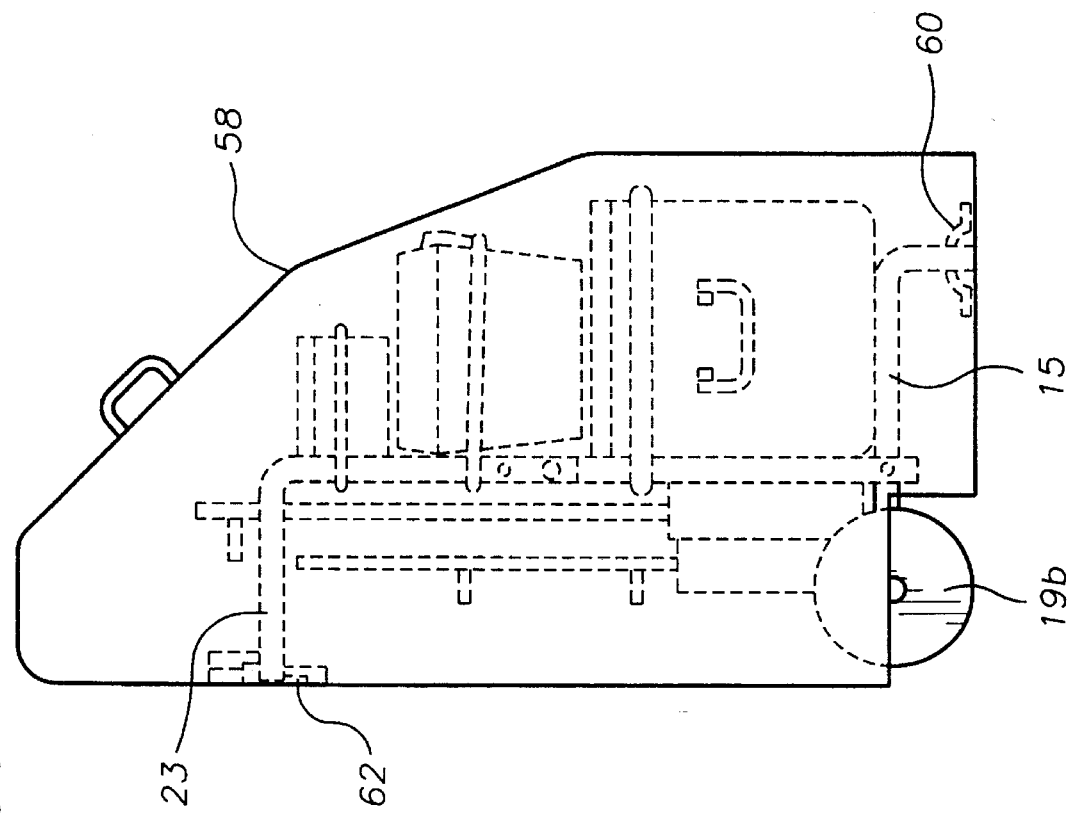
FIG. 4 is a side view of an exemplary embodiment of the travel cover of the fishing cart system of the present invention with the cart assembly of FIG. 5 shown disposed therein in dashed lines.

FIG. 4 shows a waterproof, protective outer cover 58 constructed from nylon fabric and securable to fishing equipment support structure 15 and handle assembly 23 of collapsible cart 10, while in the loaded configuration shown in FIG. 3A, utilizing cover securing tabs 60,62 respectively. FIG. 5 shows securing tabs 60,62 with collapsible cart 10 removed. In this embodiment, securing tabs 60,62 include flaps 64,66 having sections of hook and pile fastener 68,70 secured to the free ends thereof and two sections 72,74 of hook and pile fastener secured to the interior wall of cover 58.

FIG. 6 is a front view of cover 58 showing a zippered opening 76 running along the front length thereof and two handles 78,80 constructed from nylon strapping and stitched to cover 58 adjacent to zippered opening 76. FIG. 7, a bottom view of cover 58, more clearly shows a pair of wheel slots 82,84 through which, as shown in FIG. 4, wheels 19a,19b are functionally disposed when cover 58 is in place. Inclusion of slots 82,84 allows wheels 19a,19b to function while cover 58 is in use. While cover 58 provides protection to the fishing equipment and passengers while traveling with cart 10 on a common carrier, cover 58 also provides a protective dust barrier to protect fishing equipment when the fishing cart and equipment are stored in a garage, storeroom, etc.

It can be seen from the preceding description that a fishing cart system for easily transporting a quantity of fishing equipment from one fishing spot to another; that allows for easy storage of the fishing cart when it is not in use; and that allows a quantity of fishing equipment to be transported safely and conveniently on common carriers such as commuter buses and/or trains has been provided.

It is noted that the embodiment of the fishing cart described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fishing cart system comprising:

a collapsible cart including:

a U-shaped central support member, a plurality of fishing rod and reel storage tubes secured to said central support member, a fishing equipment support structure, pivotally connected to said central support member, having a wheel assembly comprising first and second wheel members connected together with an elongated axle, and a handle assembly, pivotally connected to said central support member in a manner to allow said handle assembly to pivot within a plane about one-hundred-eighty (180°) degrees with respect to said central support member; and a cover, securable to said fishing equipment support structure and said handle assembly of said collapsible cart while said collapsible cart is disposed within a compartment formed within said cover utilizing first and second cover securing assemblies, each of said first and second cover securing assemblies having a portion thereof secured to an interior wall of said cover, said cover including first and second wheel slots formed therethrough in registration with said wheels when said cover is secured to said fishing equipment support structure and said handle assembly in a manner to allow said wheel members to function.

2. The fishing cart system of claim 1 wherein:

each of said first and second cover securing assemblies includes a flap having a first section of hook and pile fastener secured to a free end thereof and a second section of hook and pile fastener secured to said interior wall of said cover.

3. A fishing cart system comprising:

a collapsible cart including:

a U-shaped central support member, a plurality of fishing rod and reel storage tubes secured to said central support member, a fishing equipment support structure, pivotally connected to said central support member, having a wheel assembly comprising first and second wheel members connected together with an elongated axle, and a handle assembly, pivotally connected to said central support member in a manner to allow said handle assembly to pivot within a plane about one-hundred-eighty (180°) degrees with respect to said central support member; and a cover, securable to said fishing equipment support structure and said handle assembly of said collapsible cart while said collapsible cart is disposed within a compartment formed within said cover utilizing first and second cover securing assemblies, each of said first and second cover securing assemblies having a portion thereof secured to an interior wall of said cover;

said fishing equipment support structure contacting a bottom portion of said storage tubes when said fishing equipment support structure is oriented at about a ninety degree (90°) angle with respect to said central support member in a manner to form an L-shaped transportation structure;

each of said first and second cover securing assemblies including a flap having a first section of hook and pile fastener secured to a free end thereof and a second section of hook and pile fastener secured to said interior wall of said cover;

said cover including first and second wheel slots formed therethrough in registration with said wheels when said cover is secured to said fishing equipment support structure and said handle assembly in a manner to allow said wheel members to function.

4. A fishing cart system comprising:

a collapsible cart including:

a U-shaped central support member, a plurality of fishing rod and reel storage tubes secured to said central support member, a fishing equipment support structure, pivotally connected to said central support member, having a wheel assembly comprising first and second wheel members connected together with an elongated axle, and a handle assembly, pivotally connected to said central support member in a manner to allow said handle assembly to pivot within a plane about one-hundred-eighty (180°) degrees with respect to said central support member; and a cover, securable to said fishing equipment support structure and said handle assembly of said collapsible cart while said collapsible cart is disposed within a compartment formed within said cover utilizing first and second cover securing assemblies each of said first and second cover securing assemblies having a portion thereof secured to an interior wall of said cover;

said central support member including a first terminal span, second terminal span, and a central span located between said first terminal span and said second terminal span; said central support member further including a pair of coaxially aligned aperture pairs, one pair each formed through said first and second terminal spans respectively;

said handle assembly including two pairs of coaxially aligned handle locking apertures;

said cover including first and second wheel slots formed therethrough in registration with said wheels when said cover is secured to said fishing equipment support structure and said handle assembly in a manner to allow said wheel members to function;

said collapsible cart further including a removable locking bar having a diameter and length sufficient to allow first and second portions of said locking bar to be simultaneously disposed through said aperture pairs and said handle locking apertures; and said fishing equipment support structure contacting a bottom portion of said storage tubes when said fishing equipment support structure is oriented at about a ninety degree (90°) angle with respect to said central support member in a manner to form an L-shaped transportation structure.

5. The fishing cart system of claim 4, wherein:

at least one of said storage tubes has a diameter of about two inches.

* * * * *